(12) United States Patent  (10) Patent No.: US 9,138,847 B2
Yeh  (45) Date of Patent: Sep. 22, 2015

(54) SPRAYING DEVICE FOR USE IN MACHINING CENTER

(71) Applicant: Advanced Equipment System Co., Ltd., Taipei (TW)

(72) Inventor: Wen-Che Yeh, Taipei (TW)

(73) Assignee: ADVANCED EQUIPMENT SYSTEM CO., LTD., Taipei (TW)

( * ) Notice: Subject to any disclaimer, the term of this patent is extended or adjusted under 35 U.S.C. 154(b) by 0 days.

(21) Appl. No.: 14/569,739

(22) Filed: Dec. 14, 2014

(65) Prior Publication Data

US 2015/0174721 A1 Jun. 25, 2015

(30) Foreign Application Priority Data

Dec. 20, 2013 (TW) .............................. 102147401 A

(51) Int. Cl.
*B23Q 11/10* (2006.01)
*B23Q 11/12* (2006.01)

(52) U.S. Cl.
CPC ........ *B23Q 11/1076* (2013.01); *B23Q 11/1015* (2013.01)

(58) Field of Classification Search
CPC ........... B23Q 11/1015; B23Q 11/1038; B23Q 11/1076; B23B 2250/12

USPC .......................................... 82/50, 52; 407/11
See application file for complete search history.

(56) References Cited

U.S. PATENT DOCUMENTS

| 4,213,354 | A | * | 7/1980 | Dahinden | ....................... | 82/1.11 |
| 5,388,487 | A | * | 2/1995 | Danielsen | ....................... | 82/158 |
| 6,595,727 | B2 | * | 7/2003 | Arvidsson | ....................... | 407/35 |
| 8,784,022 | B2 | * | 7/2014 | Leishman et al. | ............ | 409/136 |
| 2002/0127067 | A1 | * | 9/2002 | Lagerberg | ....................... | 407/11 |

* cited by examiner

*Primary Examiner* — Will Fridie, Jr.
(74) *Attorney, Agent, or Firm* — Guice Patents PLLC

(57) ABSTRACT

The present invention provides a spraying device for use in machining center, which is installed at the front flange of a spindle in a machining center and includes: a fastening member having the inner side and the outer side respectively formed with an inner connecting edge and an outer connecting edge; and a spray member respectively and axially extended with an inner flange and an outer flange, thereby defining an accommodation space, so a coolant can pass at least one water inlet for entering the accommodation space; wherein the peripheral surface of the spray member is formed with at least one row of cooling array composed of plural primary ejecting holes having the inclined angles determined according to the cutting range of the tool, so the coolant ejected by the primary ejecting holes are able to be gathered within the cutting range of the tool.

10 Claims, 5 Drawing Sheets

A-A

SPRAYING DEVICE FOR USE IN MACHINING CENTER

BACKGROUND OF THE INVENTION

1. Field of the Invention

The present invention relates to the technical field of a machining center, especially to a spraying device for use in machining center and capable of effectively providing a cooling or lubricating effect to a tool and a work piece.

2. Description of Related Art

A machining center, such as a high-speed spindle having a tool, is a common processing machinery, and the objective of cutting and processing is mainly achieved through the hardness difference between a tool and a work piece. During the processing operation, the tool would generate large amount of heat due to friction, a coolant has to be continuously sprayed on the tool during the processing operation, so the hardness of the tool can be prevented from being altered because of the heat and the cutting surface of the processed work piece can be prevented from being deformed due to the thermal expansion cold shrinkage, thereby avoiding the problems of the precision being affected or the tool being rapidly worn out.

A conventional spraying device for use in machining center includes at least one convey pipe, each of the convey pipes is provided with flexibility so the angle for spraying a coolant can be adjusted when the tool is served to cut the work piece so as to provide a cooling or lubricating effect. One end of the convey pipe is formed with a water inlet and a gas inlet for respectively inputting coolant and gas, and the other end of the convey pipe is formed with an ejecting port for ejecting the coolant and the gas, so the coolant is able to be ejected to the distal portion of the tool through the high pressure effect provided by the high pressure gas, and the objective of cooling the tool and removing debris generated during the cutting process can be achieved.

However, when the plural convey pipes are served to spray the coolant at the same time, a manual force is required for adjusting the spraying direction and angle of each of the convey pipes, so the coolant is unable to be precisely sprayed within the cutting range defined by the tool and the work piece, and the coolant cannot be gathered thereby causing operations such as cooling, cleaning and lubricating the tool and the work piece not being able to be processed, so the processing quality for the work piece and the service life of the tool would be affected.

SUMMARY OF THE INVENTION

One primary objective of the present invention is to a spraying device for use in machining center, which is installed at the front flange of a spindle in a machining center, and the spraying device provided by the present invention has advantages of the coolant being gathered, the tool and the work piece being effectively cooled, the service life of the tool being prolonged and the work piece being less likely to be deformed.

For achieving said objective, one technical solution provided by the present invention is to provide a spraying device for use in machining center, which is installed at the front flange of a spindle in a machining center and includes: a fastening member, wherein the inner side and the outer side thereof are respectively formed with an inner connecting edge and an outer connecting edge; and a spray member, wherein the spray member is respectively and axially extended with an inner flange and an outer flange capable of being mutually engaged and corresponding to the inner connecting edge and the outer connecting edge, thereby defining an accommodation space between the fastening member and the spray member, so the coolant is allowed to pass at least one water inlet for entering the accommodation space; wherein the peripheral surface of the spray member is formed with at least one row of radially-arranged cooling array composed of a plurality of primary ejecting holes communicated with the accommodation space, and the inclined angles defined in the primary ejecting holes are determined according to the cutting range of the tool, so the coolant ejected by the primary ejecting holes are able to be gathered within the cutting range of the tool.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
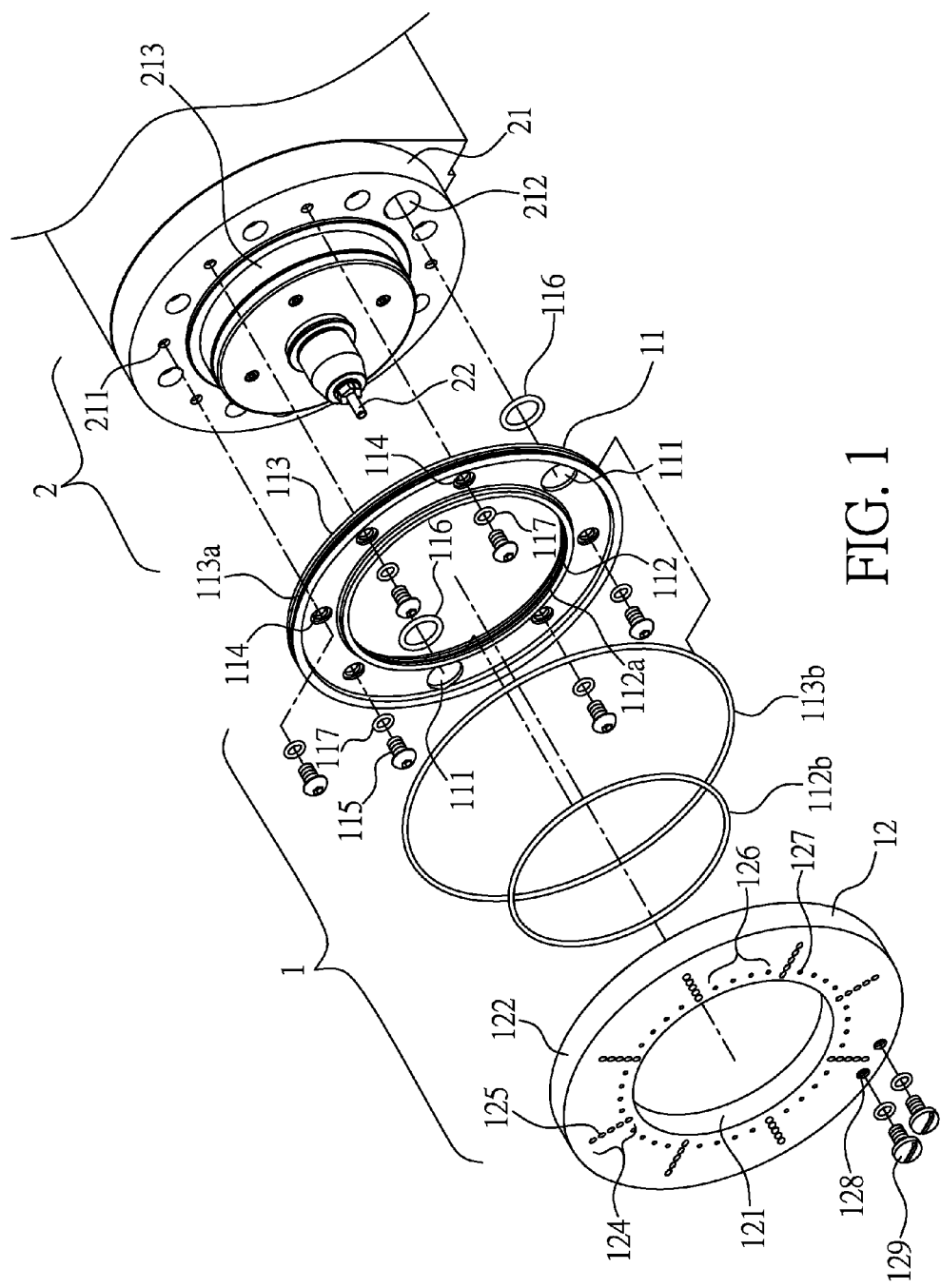
FIG. 1 is a perspective exploded view illustrating the spraying device according to the present invention.

Referring from FIG. 1 to FIG. 4, the present invention provides a spraying device 1 installed at the front flange of a spindle 21 in a machining center 2, wherein the machining center 2 is e.g. but not limited to a high-speed spindle. The spraying device 1 includes a fastening member 11 and a spray member 12 engaged with the fastening member 11 for forming a fluid sealing status.

Figure 2:
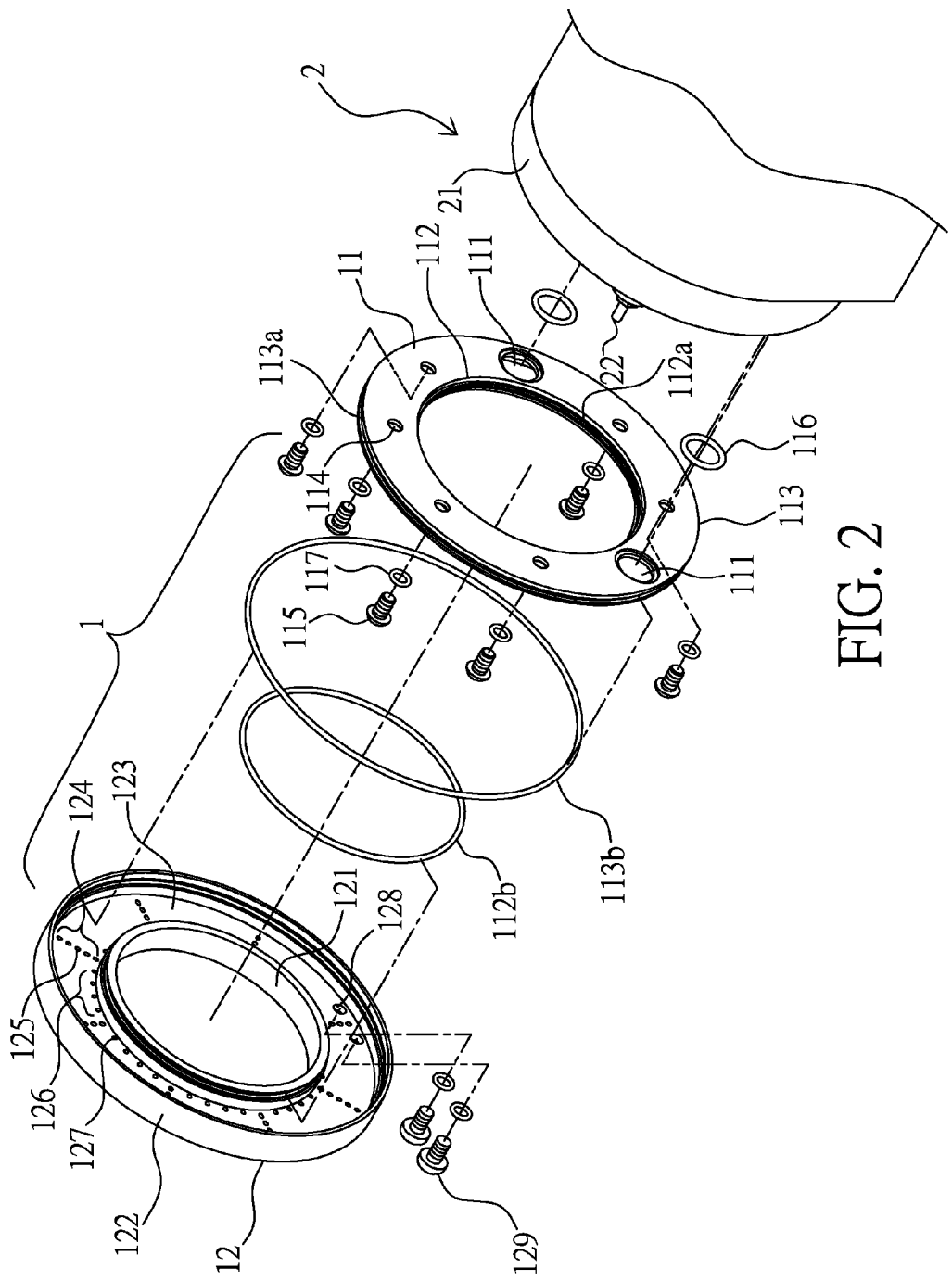
FIG. 2 is another perspective exploded view illustrating the spraying device according to the present invention.

The fastening member 11 is preferably to be a metal annular member, and the peripheral surface thereof is axially formed with at least one water inlet 111, and the inner side and the outer side thereof are respectively formed with an inner connecting edge 112 and an outer connecting edge 113 for being directly sleeved in an accommodation space 123 defined at the rear of the spray member 12. As shown in FIG. 1 and FIG. 2, the quantity of the water inlet 111 is two, and the peripheral surface of the fastening member 111 is axially formed with a plurality of penetrated holes 114 thereby allowing conventional connection members 115, e.g. screws, to pass so as to be fastened in connection holes 221 axially preformed at the front flange of the spindle 21 in the machining center 2, thereby enabling the fastening member 11 to be fastened at the front flange of the spindle 21.

Figure 4:
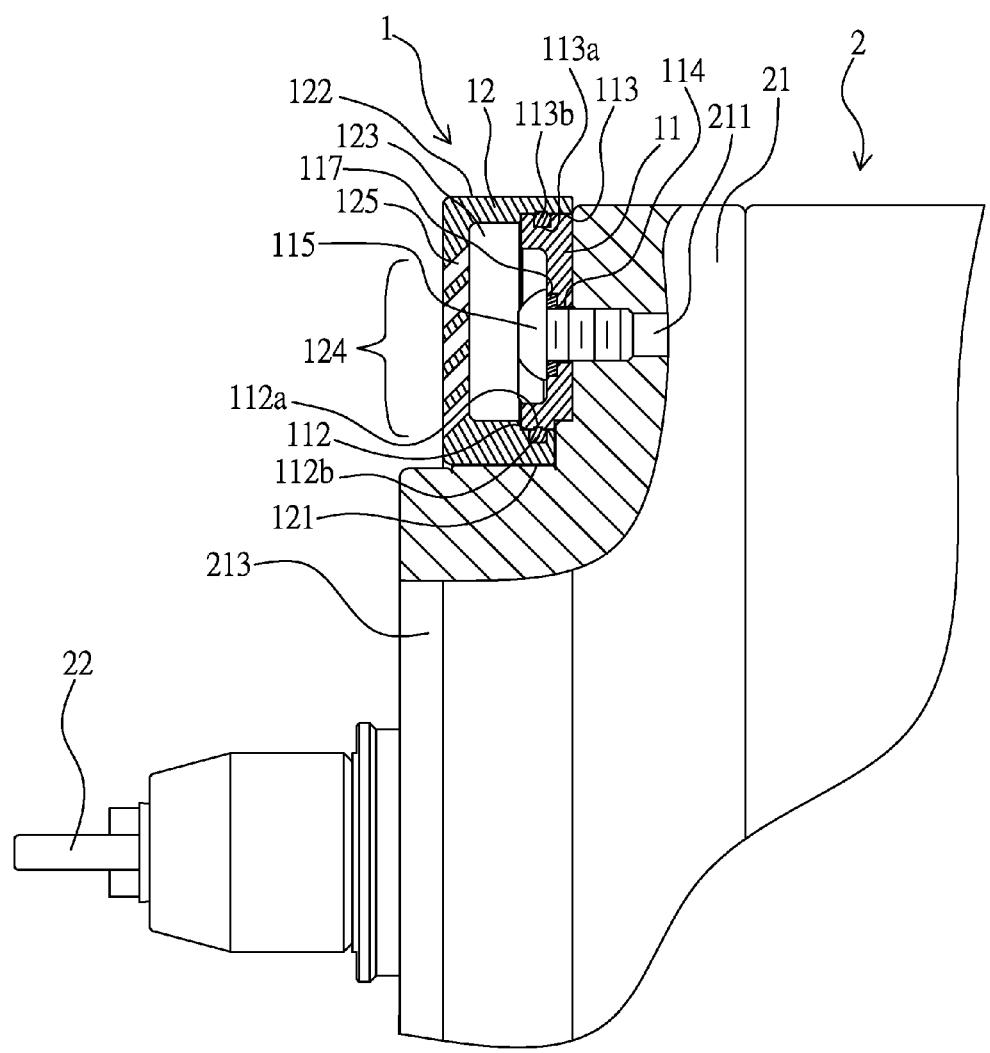
FIG. 4 is a cross sectional view of FIG. 3 taken along line A-A.

Wherein, each of the water inlets 111 and each of the penetrated holes 114 are both formed as a stepped hole and respectively sleeved with a sealing ring 116, 117 made of a polymer material thereby respectively forming a fluid sealing status. As shown in FIG. 4, each of the connection members 115 is sleeved in each of the penetrated holes 114 for pressing and squeezing the corresponding sealing ring 117, thereby preventing fluid from leaking through the penetrated holes 114.

In addition, the spindle 21 of the machining center 2 is respectively formed with a water outlet pipeline 212 corresponding to each of the water outlets 111, the above-mentioned sealing ring 116 is disposed between the water outlet 111 and the water outlet pipeline 212 for forming the fluid sealing status, and the water outlet pipeline 212 allowing the coolant to flow therein is formed in the machining center 2, e.g. but not limited to the high-speed spindle, thereby enabling the water outlet pipeline 212 to be provided with a function of circulating and dissipating heat. What shall be addressed is that the installation of the water outlet pipeline is not limited to the above-mentioned arrangement, in other words the water outlet pipeline can also be formed at the exterior of the machining center 2 and connected to the water outlet 111.

Moreover, the inner connecting edge 112 and the outer connecting edge 113 are respectively and radially formed with an inner groove 112a and an outer groove 113a so as to be respectively sleeved with an inner sealing ring 112b and an outer sealing ring 113b, thereby allowing the fluid sealing status to be formed after being connected to the spray member 12.

The spray member 12 is preferably to be a metal cover member, and respectively and axially extended with an inter flange 121 and an outer flange 122 capable of being mutually engaged and corresponding to the inner connecting edge 112 and the outer connecting edge 113, thereby defining the above-mentioned accommodation space 123 between the fastening member and the spray member, so the coolant is allowed to pass the water inlet 111 for entering the accommodation space 123. What shall be addressed is that the above-mentioned water inlet 111 is not limited to be formed on the fastening member 1, in other words at least one water inlet (not shown in figures) can also be radially formed on the peripheral surface of the outer flange 122 of the spray member 12.

As shown from FIG. 1 to FIG. 4, when the spray member 12 is desired to be assembled with the fastening member 11, the accommodation space 123 of the inner flange 121 and the outer flange 122 is directly sleeved in the inner connecting edge 112 and the outer connecting edge 113 having the inner sealing ring 112b and the outer sealing ring 113b, so the inner sealing ring 112b is pressed and squeezed between the inner flange 121 and the inner connecting edge 112, and the outer sealing ring 113b is pressed and squeezed between the outer flange 122 and the outer connecting edge 113, thereby forming the connecting and fluid sealing status. As such, the assembly of the fastening member 11 and the spray member 12 does not require any tool or connection member thereby being provided with advantages of fast and easy in assembling, tool free and convenient in cleaning.

The inner flange 121 of the spray member 12 is able to be sleeved and positioned in a connection ring 213 formed at the front flange of the spindle 21, so the spraying device 1 is allowed to be disposed between the spindle 21 and the tool 22 of the machining center 2.

Figure 3:
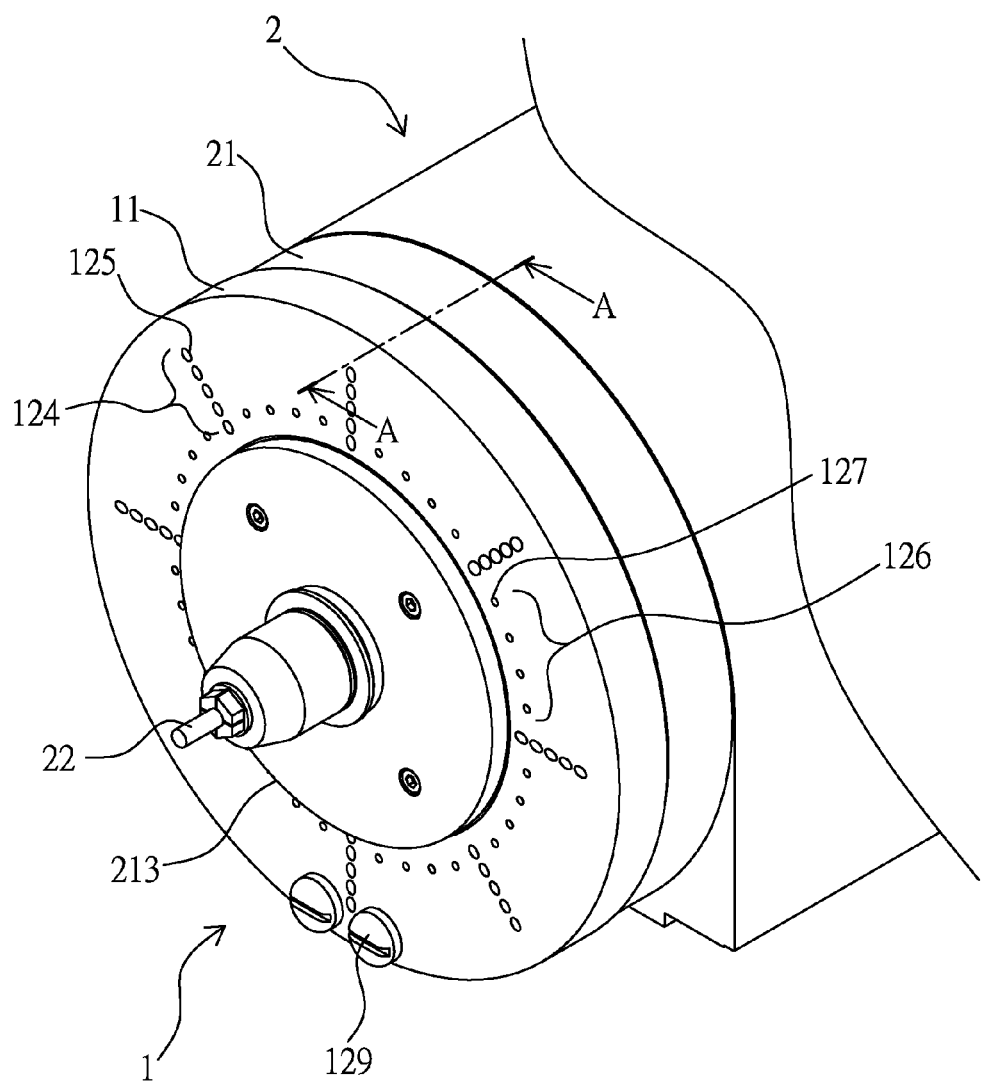
FIG. 3 is a perspective view illustrating the spraying device being installed on a machining center according to the present invention.

In addition, the peripheral surface of the spray member 12 is formed with at least one row of radially-arranged cooling array 124 composed of a plurality of primary ejecting holes 125 communicated with the accommodation space 123; as shown in FIG. 1 and FIG. 3, the quantity of the cooling array 124 is eight rows, and each row is formed with five primary ejecting holes 125. As shown in FIG. 4, the inclined angles defined in the primary ejecting holes 125 are determined according to the cutting range of the tool 22 shown in FIG. 5, so the coolant ejected by the primary ejecting holes 125 are able to be gathered within the cutting range of the tool 22 for processing a work piece 23, thereby being provided with advantages of the coolant being gathered, the tool and the work piece being effectively cooled, the service life of the tool being prolonged and the work piece being less likely to be deformed.

Figure 5:
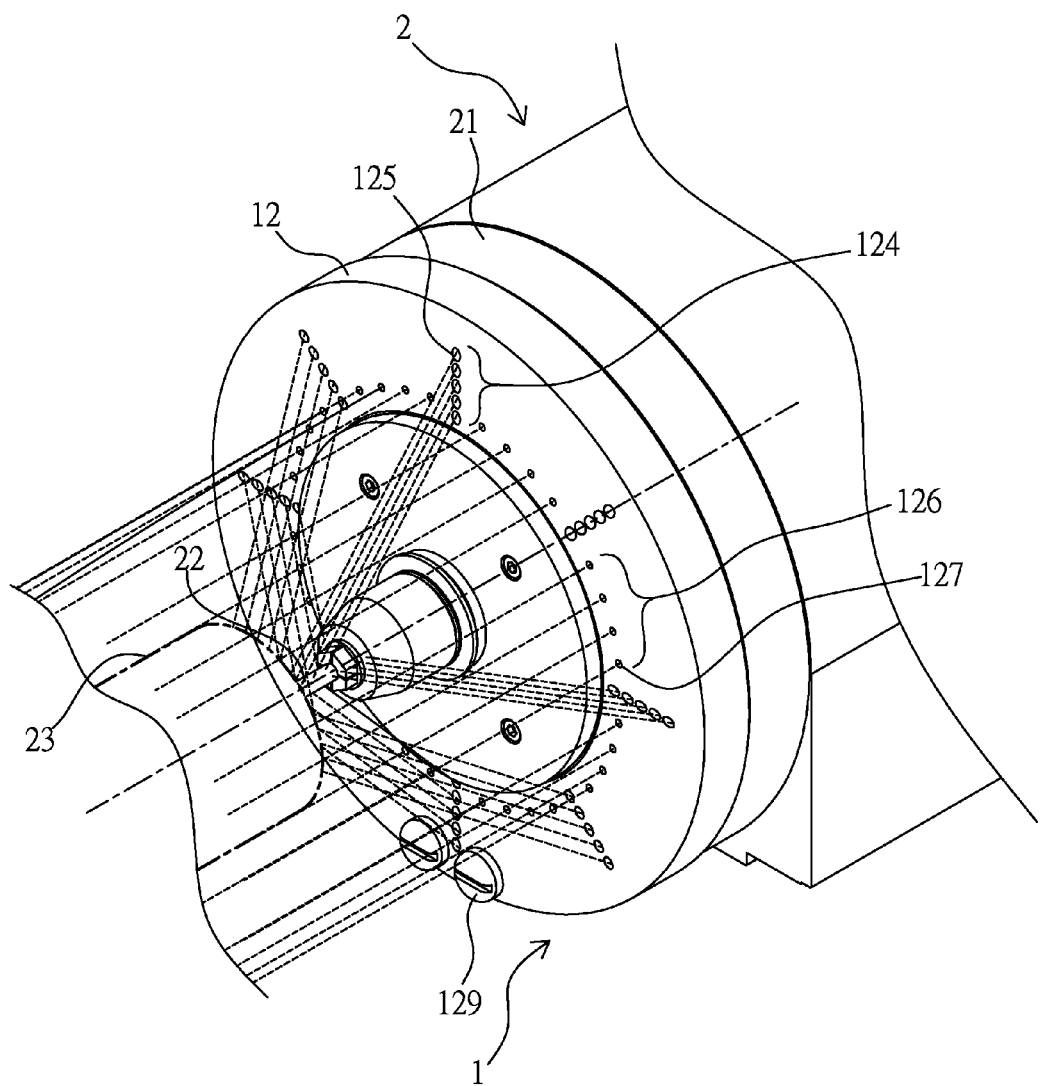
FIG. 5 is a schematic view illustrating the spraying device spraying the coolant according to the present invention.

Moreover, the peripheral surface of the spray member 12 is formed with at least one circle of cleaning array 126 composed of a plurality of secondary ejecting holes 127; as shown in FIG. 1 and FIG. 3, the cleaning array 126 is adjacently arranged with the cooling arrays 124, and the secondary ejecting holes 127 are arranged as straight holes thereby allowing the coolant ejected by the secondary ejecting holes 127 to be in a circular status as shown in FIG. 5, so debris generated when the tool 22 is served to cut the work piece 23 can be removed, thereby being provided with advantages of effectively cleaning and preventing debris from entering the machining center 2.

Furthermore, the peripheral surface defined at the bottom end of the spray member 12 is axially formed with at least one debris discharging hole 128, and an end cover 129, e.g. a screw, is provided for opening or closing the debris discharging hole 128, so the debris discharging hole 128 is able to be closed for operation or opened for discharging debris.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. A spraying device for use in machining center, installed at the front flange of a spindle in a machining center, comprising:

a fastening member, wherein the inner side and the outer side thereof being respectively formed with an inner connecting edge and an outer connecting edge; and a spray member, wherein the inner side and the outer side thereof being respectively and axially extended with an inner flange and an outer flange capable of being mutually engaged with said inner connecting edge and said outer connecting edge of said fastening member, thereby defining an accommodation space between said fastening member and said spray member, so a coolant being allowed to pass at least one water inlet for entering said accommodation space; wherein the peripheral surface of said spray member being formed with at least one row of radially-arranged cooling array composed of a plurality of primary ejecting holes communicated with said accommodation space, and the inclined angles defined in said primary ejecting holes being determined according to the cutting range of said tool, so said coolant ejected by said primary ejecting holes being able to be gathered within the cutting range of said tool.

2. The spraying device for use in machining center as claimed in claim 1, wherein the peripheral surface of said spray member is formed with at least one circle of cleaning array composed of a plurality of secondary ejecting holes, said cleaning array is adjacently arranged with said cooling arrays, and said secondary ejecting holes are formed as straight holes thereby allowing said coolant ejected by said secondary ejecting holes to be in a circular status.

3. The spraying device for use in machining center as claimed in claim 1, wherein the peripheral surface defined at the bottom end of said spray member is axially formed with at least one debris discharging hole, and an end cover is provided for opening or closing said debris discharging hole.

4. The spraying device for use in machining center as claimed in claim 2, wherein the peripheral surface defined at the bottom end of said spray member is axially formed with at least one debris discharging hole, and an end cover is provided for opening or closing said debris discharging hole.

5. The spraying device for use in machining center as claimed in claim 1, wherein said inner connecting edge and said outer connecting edge of said fastening member are respectively radially formed with an inner groove and an outer groove so as to be respectively sleeved with an inner sealing ring and an outer sealing ring made of a polymer material; and said inner flange and said outer flange of said spray member are served to press and squeeze said inner sealing ring and said outer sealing ring for forming a connecting and fluid sealing status.

6. The spraying device for use in machining center as claimed in claim 1, wherein said fastening member is a metal annular member, and the peripheral surface thereof is axially formed with at least one water inlet and a plurality of penetrated holes; connection members are able to pass said penetrated holes and fasten said metal annular member at said front flange of said spindle in said machining center.

7. The spraying device for use in machining center as claimed in claim 6, wherein said water inlet and said penetrated holes are all formed as stepped holes and respectively sleeved with a sealing ring made of a polymer material.

8. The spraying device for use in machining center as claimed in claim 6, wherein said front flange of said spindle in said machining center is formed with a water outlet pipeline corresponding to said water outlet, and said water outlet pipeline allowing said coolant to flow therein is formed in said machining center equipped with said spray device.

9. The spraying device for use in machining center as claimed in claim 1, wherein said spray member is a metal cover member, and the peripheral surface thereof is radially formed with at least one water inlet.

10. The spraying device for use in machining center as claimed in claim 1, wherein said front flange of said spindle in said machining center is formed with a connection ring allowing said inner flange of said spray member to be sleeved and positioned.

* * * * *